even though the projector is in an upright position on a support surface.

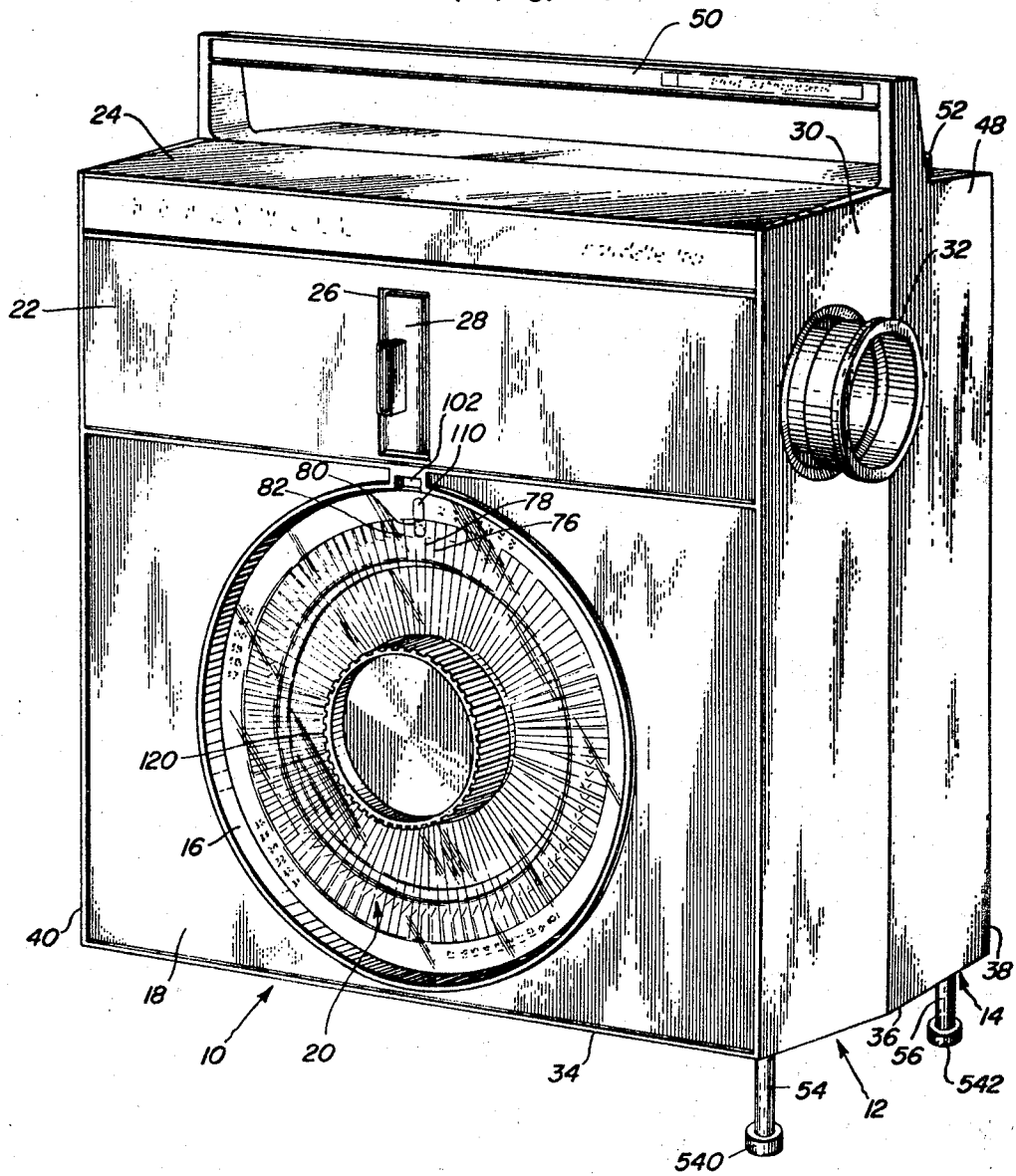

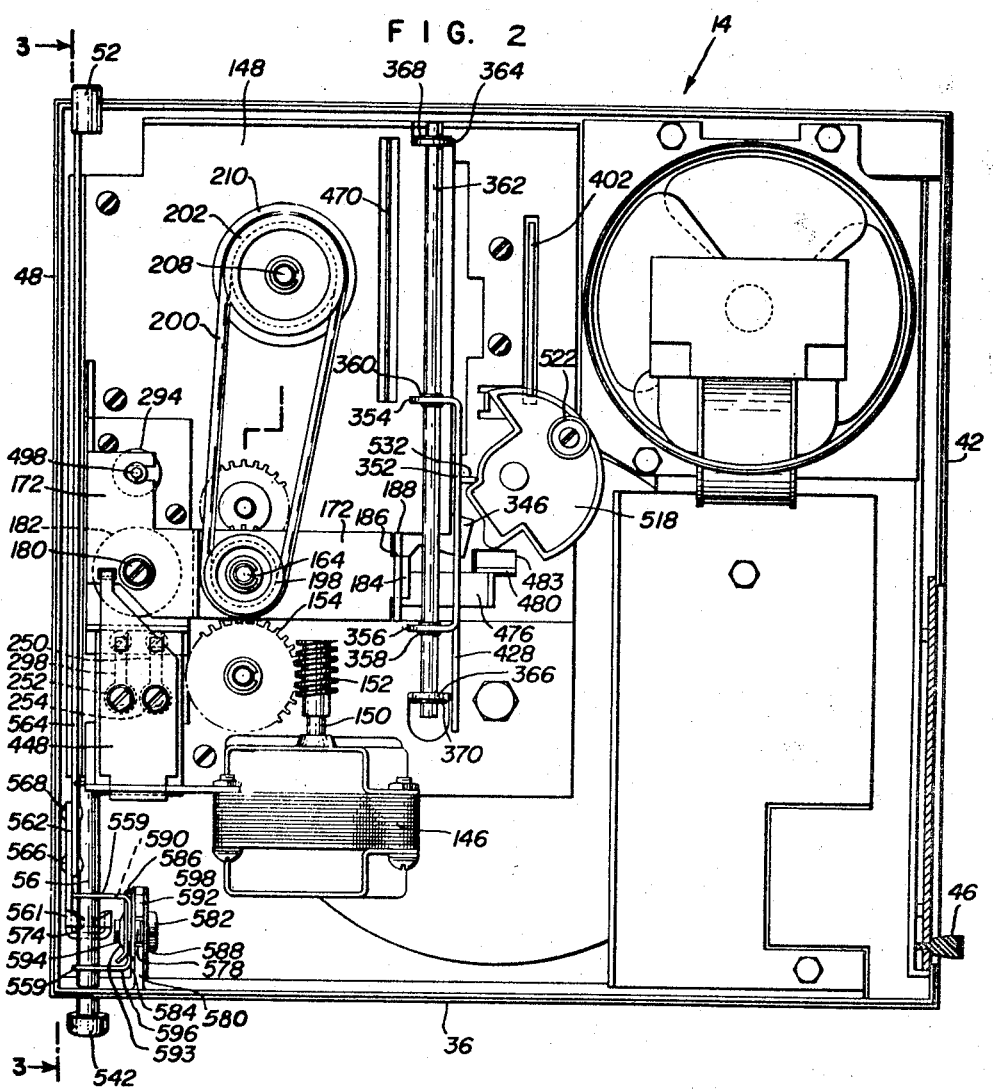

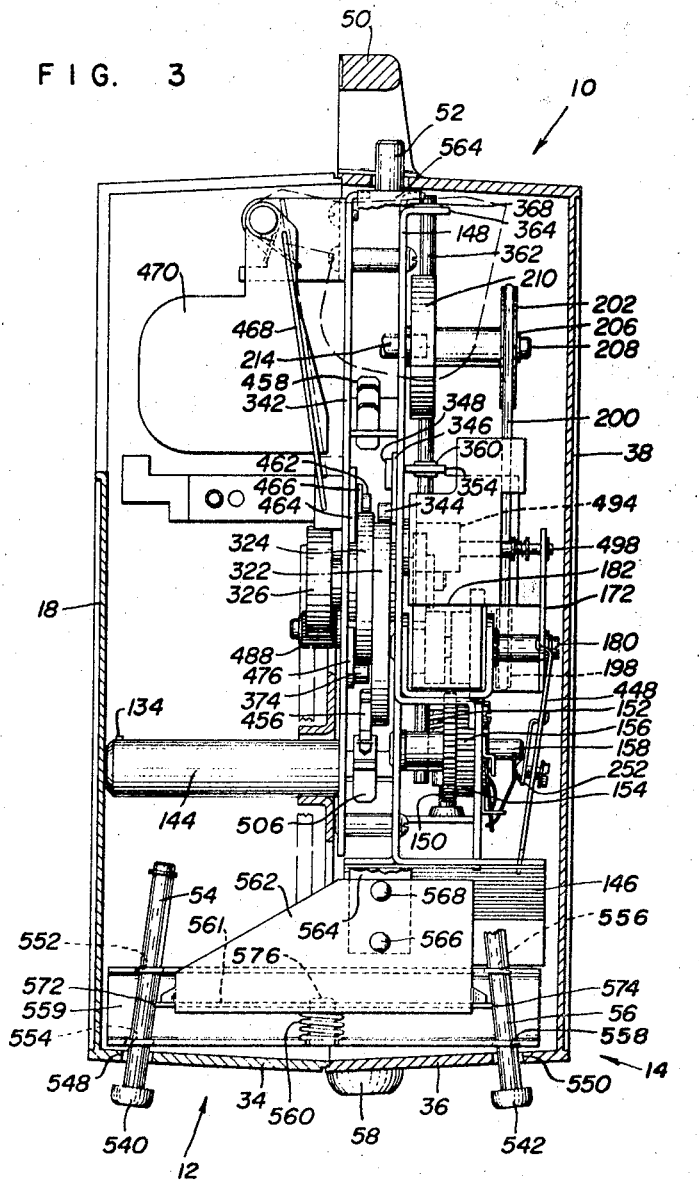

3,448,950
PROJECTOR TILT ADJUSTMENT
Robert D. Kluge, Westminster, Colo., assignor to Honeywell Inc., Minneapolis, Minn., a corporation of Delaware
Original application Aug. 16, 1965, Ser. No. 480,032, now Patent No. 3,349,510, dated Oct. 31, 1967. Divided and this application June 29, 1967, Ser. No. 658,973
Int. Cl. F16m 1/00, 11/16
U.S. Cl. 248—11      4 Claims

This is a division of application Ser. No. 480,032, filed Aug. 16, 1965, now Pat No. 3,349,510.

The present invention relates to a photographic slide tray projector.

It is one of the objects of the present invention to provide a leveling device for raising and lowering the image projecting end of the projector which will considerably reduce the time that has heretofore been required when commercially-available jack screw leveling device or articles such as stacked books are called upon to accomplish this projector leveling feat.

More specifically, it is an object of the present invention to provide a built-in push-button actuating leveling device for the aforementioned projector that will allow a pair of spaced-apart projector supported legs to be extended through one end of its base against a level or a non-level object on which it is to be positioned to shown slides and to also allow the front end of the projector to be pivoted on and about a centrally located stationary back leg to a desired picture projecting angle when the push-button position of the leveling device is depressed and which will thereafter support the projector in the desired picture projecting position when a push-button is released.

A better understanding of the present invention may be had from the following detailed description when read in connection with the accompanying drawings in which:

FIGURE 1 shows a perspective view of the projector;
FIGURE 2 shows a rear view of the projector; and
FIGURE 3 is a view partially in section taken along the line 3 of FIGURE 2.

The projector 10 is provided with a single fixed foot 58 adjacent its right end and two adjustable feet 540, 542 adjacent its left end. The front feet 540, 542 are attached to their associated rods 54, 56 that pass through their respective walls 548, 550 that form clearance openings in the respective base parts 34, 36 of the projector 10 and then through their associated non-aligned walls 552, 554, 556, 558 that form clearance holes in the flange of the channel-shaped chassis support bracket 559. Each pair of walls 552, 554, 556, 558 is, therefore positioned with respect to one another so that each rod 54, 56 has its upper end tipped inward at a small angle to the vertical shown in FIGURE 3. Located between the two rods 54, 56 and urged upward by the spring 560 is a locking piece 561 forming leg-engaging parts of a locking piece or brake 562. The brake 562 is fixedly connected to the link 564 by means of the rivets 566, 568. The depression of the knob 570 that is mounted on the top end of the link 564 overcomes the force of the spring 560 as it is moved downwardly out of frictional engagement with the rods 54, 56 as the spring 560 is guided by the tab 576 that is fixedly connected to the bracket 559 so that the rods 54, 56 are free to move axially. While the rods 54, 56 are free, the projector 10 may be raised and lowered or tilted laterally about the longtiudinal center line of the base on its foot 538.

The aforementioned construction for the support legs or rods 54, 56 of the projector 10 will enable either one of its two leg portions 54, 56 to be mounted in any one of a number of a variety of extended positions on one support surface while its other leg 56 or 54 is mounted in any one of a different number of other extended positions on the same or a different support surface that it at the same level or which is at a different level than that on which the first-mentioned leg is mounted.

As soon as the then depressed knob 570 is released, the portions 572, 574 on the opposite ends of the brake part 561 are urged by the force of spring 560 so that the two rods 54, 56 are forced outward against the lower outer edge portions of their associated apertured walls 552, 554, 556, 558 and thereby locked in the desired position by the wedging action of the locking piece 561 in the shallow angle area that is formed between the two legs 54, 56. The weight acting on the two legs 54, 56 is also employed to increase the aforementioned locking action after the knob 570 has been released.

One preferred way of mounting the aforementioned support bracket 559 directly on the chassis of the projector 10, is as shown in FIGURE 2. With the FIGURE 2 construction, a wall 578 forming a U-shaped slot in the end of the stationary rectangular chassis plate 580 is shown havig a threaded screw connecting means 582 extruding therethrough and through an aperture 584 in the webbed portion of the channel-shaped bracket 559. An N-shaped spring clip 586 is shown mounted at one of its ends between a spring washer 588 and the right surface of the chassis plate 580 and at its other end in spring engaging surface contact with the inner vertical surface of the bracket 559. A left upper portion of the spring clip 586 is shown passing through a wall 590 that forms an aperture in the bracket 559 and another wall 592 that forms an aperture in the upper end of the chassis plate 580. A spring retaining means 593 is shown mounted in a grooved-out surface portion 595 to retain the central portion of the bracket 559 and central portion of the spring clip 586 in fixed relation with the chassis plate 580. This construction thus enables the lower and upper flange portions 596, 598 to always have a spring bias applied thereto so that the aforementioned leg retaining function which these bracket flange portions perform can be carried out in an efficient manner for the life of the projector 10.

I claim:
1. A leveling apparatus for raising, lowering and angularly displacing the projecting lens end of a projector, comprising a foot fixedly connected to a central end portion of a V-shaped plate forming a base of the projector, a wall forming a pair of spaced-apart apertures at an opposite end of the base and on opposite sides of the longitudinal center line of the projector, a channel mounted within the projector extending across the said opposite end of the base, a first pair of angularly displaced walls forming a non-aligned aperture in each flange of the channel at one of its ends and a second pair of angularly displaced walls forming a second pair of non-aligned apertures in a channel at its opposite end portion, a first leg passing through the first pair of the non-aligned apertures and one of the associated apertures in the base, a second leg passing through the second pair of non-aligned apertures and the other aperture in the base, a brake member having a flat plate extending between the legs at a position that is between the flanges of the channel, a biasing means connected to the inner surface of the base plate and the brake member to force gripping edge portions formed on the opposite ends of the flat plate away from the base plate into gripping engagement with their associated legs and force the opposite side of the legs into frictional retaining engagement with portions of the non-aligned walls in the flange portion of the channel with which they are associated, and a push-button operably connected with the brake member to manually compress the brake member against the biasing means to free the gripping portions from the legs so that a change in length of either leg can be accomplished when it is placed in a first depressed push-button position and to effect the aforementioned leg gripping action when the push-button is placed in a second released position.

2. A leveling apparatus for positioning a projector in an appropriate position for its lens to project a level picture on a projecting screen when the projector is placed on a non-level supporting surface, comprising a stationary foot forming a stationary pivot on the base portion that is adjacent one end of the projector, a pair of converging leg portions at the opposite end of the base, each extending through an apertured wall portion in the base and through separate non-aligned apertured wall portions in the flanges of a channel that is attached to the base, and a two-position manually-operated, spring-biased unitary flat plate extending between said legs and having an edge adjacent each leg to engage their associated legs and force them into frictional gripping engagement with a portion of the walls forming the non-aligned apertures in their associated flanges when the brake means is placed in one operating position and the brake means being operably connected for movement to another position to release the legs for free movement in the slots when it is desired to reposition the projector in another desired preselected screen projecting position.

3. A leveling apparatus for positioning a projector in an appropriate position for its lens to project a level picture on a projecting screen when the projector is placed on a non-level supporting surface, comprising a stationary foot forming a stationary pivot on the base portion that is adjacent one end of the projector, a pair of converging leg portions at the opposite end of the base, each extending through an apertured wall portion in the base and through separate non-aligned apertured wall portions in a stationary member that is attached to the base, and a two-position manually-operated spring-biased unitary flat plate extending between said legs and having an edge positioned adjacent each leg to engage their associated legs and force them into frictional gripping engagement with a portion of the wall forming the non-aligned apertures in their associated stationary member when the brake means is placed in one operating position and the brake means having another position to which it can be moved to release the legs for free movement in the slots when it is desired to re-position the projector in another desired preselected screen projecting position.

4. The leveling apparatus defined by claim 2, wherein the projector is purposely provided with a pair of sloping base plate portions that extend downwardly from the lower ends of its front and rear walls toward and into contact with one another at the longitudinal center line of its base and wherein the said sloping base plate portions enable the projector to be tilted in a forward or rearward direction about the stationary foot while the length of the leg portions extending below the base are being altered to different lengths by the movement of the projector.

References Cited

UNITED STATES PATENTS

| | | | |
|---|---|---|---|
| 2,809,553 | 10/1957 | Van Den Broek | 88—24 |
| 2,944,776 | 7/1960 | Pester | 248—11 |
| 3,049,971 | 8/1962 | Pester | 88—26 |
| 3,148,583 | 9/1964 | Maiershofer | 88—24 |
| 3,251,568 | 5/1966 | Moe et al. | 248—11 |

ROY D. FRAZIER, *Primary Examiner.*

J. F. FOSS, *Assistant Examiner.*

U.S Cl. X.R.

88—24; 248—188.2